United States Patent
Bang et al.

(10) Patent No.: US 11,611,096 B2
(45) Date of Patent: Mar. 21, 2023

(54) METHOD OF PRODUCING MEMBRANE-ELECTRODE ASSEMBLIES AND MACHINE THEREFORE

(71) Applicant: BLUE WORLD TECHNOLOGIES HOLDING APS, Aalborg Ost (DK)

(72) Inventors: Mads Bang, Stovring (DK); Jakob Bork, Stovring (DK); Steffen Henrik Frensch, Aalborg (DK); Denys Gromadskyi, Ellidshoj (DK); Larysa Hromadska, Ellidshoj (DK)

(73) Assignee: BLUE WORLD TECHNOLOGIES HOLDING APS, Aalborg Øst (DK)

( * ) Notice: Subject to any disclaimer, the term of this patent is extended or adjusted under 35 U.S.C. 154(b) by 0 days.

(21) Appl. No.: 17/774,033

(22) PCT Filed: Oct. 28, 2020

(86) PCT No.: PCT/DK2020/050294
§ 371 (c)(1),
(2) Date: May 3, 2022

(87) PCT Pub. No.: WO2021/089093
PCT Pub. Date: May 14, 2021

(65) Prior Publication Data
US 2022/0393210 A1    Dec. 8, 2022

(30) Foreign Application Priority Data

Nov. 5, 2019    (DK) .......................... PA 2019 70682

(51) Int. Cl.
*H01M 8/1004*    (2016.01)
*H01M 4/88*    (2006.01)

(52) U.S. Cl.
CPC ......... *H01M 8/1004* (2013.01); *H01M 4/881* (2013.01)

(58) Field of Classification Search
CPC ........................... H01M 4/881; H01M 8/1004
See application file for complete search history.

(56) References Cited

U.S. PATENT DOCUMENTS

| | | | |
|---|---|---|---|
| 6,074,092 A | 6/2000 | Andrews | |
| 6,998,149 B2 * | 2/2006 | Kohler | H01M 4/8828 427/407.1 |
| 8,399,145 B2 * | 3/2013 | Barnwell | H01M 8/0273 429/482 |

(Continued)

FOREIGN PATENT DOCUMENTS

| | | |
|---|---|---|
| EP | 1662597 B1 | 7/2008 |
| EP | 1230705 B1 | 4/2010 |

(Continued)

OTHER PUBLICATIONS

He R et al.; Physicochemical properties of phosphoric acid doped polybenzimidazole membranes for fuel cells. Journal of Membrane Science 277 (2006) pp. 38-45.

(Continued)

*Primary Examiner* — Sonya M Sengupta
(74) *Attorney, Agent, or Firm* — Brooks Kushman P.C.

(57) ABSTRACT

Method of producing membrane-electrode assemblies (MEA) and a machine therefore, where a quasi-endless strip of a membrane material doped with a liquid electrolyte is laminated with electrodes and edge regions of the strip and spaces between the electrodes are pressed free from surplus electrolyte.

15 Claims, 7 Drawing Sheets

(56) References Cited

U.S. PATENT DOCUMENTS

| | | | | |
|---|---|---|---|---|
| 8,940,461 | B2* | 1/2015 | Zhang | H01M 4/8828 |
| | | | | 429/479 |
| 2006/0014065 | A1* | 1/2006 | Pawlik | H01M 8/0273 |
| | | | | 429/514 |
| 2007/0116999 | A1* | 5/2007 | Kuramochi | B32B 38/1841 |
| | | | | 429/534 |
| 2007/0289707 | A1* | 12/2007 | Rohland | H01M 8/1004 |
| | | | | 156/309.9 |
| 2008/0086871 | A1 | 4/2008 | Rohland | |
| 2010/0279197 | A1* | 11/2010 | Kim | H01M 4/881 |
| | | | | 429/535 |
| 2011/0240203 | A1* | 10/2011 | Cho | H01M 8/1018 |
| | | | | 156/73.1 |
| 2018/0290441 | A1* | 10/2018 | Adachi | H01M 4/8814 |
| 2022/0293969 | A1* | 9/2022 | Gromadskyi | H01M 8/0213 |
| 2022/0393210 | A1* | 12/2022 | Bang | H01M 4/881 |

FOREIGN PATENT DOCUMENTS

| | | |
|---|---|---|
| EP | 3208879 B1 | 5/2021 |
| WO | 2002042191 A1 | 5/2002 |

OTHER PUBLICATIONS

Song CH et al.; Effect of dispersion solvents in catalyst inks on the performance and durability of catalyst layers in proton exchange membrane fuel cells 12 (2019) pp. 549-559.

Cho YH et al.; Preparation of MEA with polybenzimidazole membrane for high temperature PEM fuel cell. Electrochemical and Solid-State Letters 14 (2011).

Liang H, et al.; Development of membrane electrode assembly for high temperature proton exchange membrane fuel cell by catalyst coating membrane method. Journal of Power Sources 288 (2015) pp. 121-127.

Liang X, et al.; A modified decal method for preparing the membrane electrode assembly of proton exchange membrane fuel cells. Fuel 139 (2015) pp. 393-400.

Cho JH, et al.; Fabrication and evaluation of membrane electrode assemblies by low-temperature decal methods for direct methanol fuel cell. Journal of Power Sources 187 (2009) pp. 378-386.

Mehmood A, et al. An efficient decal transfer method using a roll-press to fabricate membrane electrode assemblies for direct methanol fuel cells. International Journal of Hydrogen Energy 37 (2012) pp. 18463-18470.

Bodner M, et al.; Enabling industrial production of electrodes by use of slot-die coating for HT-PEM fuel cells. International Journal of Hydrogen Energy 44 (2019) pp. 12793-12801.

Steenberg T, et al.; Roll-to-roll coated membranes for high temperature PEM fuel cells. Energy & Environmental Science 5 (2012) pp. 6076-6080.

Calleja G, et al; Where is the glass transition temperature of poly(tetrafluoroethylene)? A new approach by dynamic geometry and mechanical tests. European Polymer Journal 49 (2013) pp. 2214-2222.

Korte C, et al; Phosphoric acid and its interactions with polybenzimidazole-type polymers. High temperature Polymer Electrolyte Membrane Fuel Cells, Springer (2016).

Mohajir BE, Heymans M. Changes in structural and mechanical behavior of PVDF with processing and thermomechanical treatments. 1. Change in structure. Polymer 42 (2001) pp. 5661-5667.

Gupta B, et al.; Radian-induced grafting of styrene onto FEP films: Structure and thermal behaviour of copolymers. Die Angewandte Makromolekulare Chemie 210 (1993) pp. 151-164.

Li QF et al; K Properties, degradation and high temperature fuel cell test of different types of PBI and PBI blend membranes. Journal of Membrane Science 347 (2010) pp. 260-270.

Daletou MK, Gourdoupi N, Kallitis JK. Proton conducting membranes based on blends of PBI with aromatic polyethers containing pyridine units. Journal of Membrane Science 252 (2005) pp. 115-122.

Lobato J, Canizares P, Rodrigo MA, Linares JJ, Aguilar JA. Journal of Membrane Science 306 (2007) pp. 47-55.

International Search Report for PCT/DK2020/050294, prepared by the Nordic Patent Institute, dated Jan. 1, 2021, 10 pages.

* cited by examiner

METHOD OF PRODUCING MEMBRANE-ELECTRODE ASSEMBLIES AND MACHINE THEREFORE

CROSS-REFERENCE TO RELATED APPLICATION

This application is the U.S. national phase of PCT Application No. PCT/DK2020/050294 filed on Oct. 28, 2020, which claims priority to DK Patent Application No. PA 2019 70682 filed on Nov. 5, 2019, the disclosures of which are incorporated in their entirety by reference herein.

FIELD OF THE INVENTION

The present invention relates to a method and system for producing membrane-electrode assemblies.

BACKGROUND OF THE INVENTION

A key part of a fuel cell is the membrane-electrode assembly (MEA) that contains two electrodes and a proton exchange membrane (PEM) between them. In general, the electrode has three layers, namely, gas-diffusion, microporous and catalytic layers (GDL, MPL and CL, respectively). In low-temperature PEM fuel cells, the polymer membrane, typically Nafion, is saturated with water. Generally, this does not pose a problem when coating the catalytic layers of the electrodes directly onto the surface of the membrane. Sheets of GDL with or without MPL are laminated onto the roll of the catalyst-coated membrane. A prior art process for producing MEAs is disclosed in U.S. Pat. No. 6,074,692, (ref [1]), which also discusses other prior art.

Unlike low-temperature PEM fuel cells, the high-temperature PEM fuel cells use polymer membranes wetted with strong electrolytes, for example orthophosphoric acid-doped polybenzimidazole ($H_3PO_4$—PBI). This acid-doped membrane provides high electrical conductivity at elevated temperatures, for example at 120-180° C., where the use of membranes based on Nafion™ is impossible, see in this context also reference [2]. Use of phosphoric acid as electrolyte liquid for doping of membranes is also disclosed in EP 1230705 B1 and US 2010/0279197 (ref [26]-[27])

Unlike water-saturated Nafion membranes, the presence of the orthophosphoric acid inside the membrane makes it difficult to coat a catalyst on the surface of the PBI membrane, and a coated CL requires rigorous drying to remove the solvents, for example iso-propanol and N-methyl-2-pyrrolidone, see also reference [3]. On the other hand, coating the CL onto the dry, undoped PBI membrane creates other difficulties due to the necessity of impregnation with acid, see reference [4]. Several research groups apply decal methods that allow transfer of dried CL onto the already doped membrane, after which the membrane is peeled off the substrate, leaving a CL-covered membrane only, see references [5-10]. However, such methods are not useful for fast, large-scale production.

Although, the methods in the prior art provide various improvements, there is a need for methods and systems for large scale production. It should be mentioned that there have been attempts of implementing separated roll-to-roll production of electrodes and $H_3PO_4$—PBI membranes, see references [11, 12]. However, as discussed in these references, the methods still need refinements in order to overcome shortcomings, such as inhomogeneities.

Other attempts are disclosed in U.S. Pat. No. 8,399,145, US2006/0014065, and U.S. Pat. No. 6,998,149 (references [13-15]) where protective tightening and gaskets are used at the side edges. Continuous lamination processes for polymer electrolyte membranes are also disclosed in US 2018/0290441 and US 2007/0116999 (ref [24]-[25]). However, also such approaches have shortcomings due to the methods becoming relatively complex in a roll-to-roll production process.

US 2007/0289707 A1, (ref [23]) describes a method for producing a membrane-electrode assembly comprising the steps of providing a continuous strip of an ionomer membrane, providing electrodes for assembly with the membrane strip and attaching the electrodes to the liquid-doped membrane strip, laminating the electrodes onto the strip in a calendering lamination station by guiding the strip in between two oppositely positioned lamination rollers, and compressing the electrodes and the strip for lamination by the two lamination rollers. The lamination rollers in US 2007/0289707 A1 has a continuous flushed surface which presses on the entire surface area of the electrodes and strip. Thus, surplus electrolyte is not removed from the edge regions of the strip during compressing.

Accordingly, there is still a need for further improvements.

DESCRIPTION/SUMMARY OF THE INVENTION

It is therefore the objective of the invention to provide an improvement in the art. Especially, it is an objective to provide an improved method and system for production of MEAs. In particular, it is an objective to provide methods and systems for large-scale production of MEAs, where the production is simple, easily automated, and a fast, continuous process.

A method of producing a membrane-electrode assembly, MEA, is described herein wherein a quasi-endless strip of a membrane material doped with a liquid electrolyte is provided, onto which electrodes are attached. The combination of a doped membrane strip and electrodes that are then laminated onto the strip in a calendering lamination station by guiding the strip in between two oppositely positioned lamination rollers and compressing the electrodes with the strip for lamination by the two lamination rollers.

The term "quasi-endless" is used herein for a long strip from a roll, which during the concrete process appears as not ending, although the roll eventually will be used up in the process. In the technical field, the term "endless" is sometimes used instead of "quasi-endless".

For performing the production, a machine is provided for producing the membrane-electrode assembly, MEA. In a concrete embodiment, the machine comprises a membrane supply station with a first roller for supplying an endless strip of a membrane material doped with a liquid electrolyte.

Further, it comprises an electrode supply station with a pair of opposite electrode supply rollers, the supply rollers placing the electrodes onto one side, but typically both sides, of the membrane strip. For example, the electrode supply station is configured for placing electrodes onto the membrane strip, typically one or two at a time, with a predetermined longitudinal spacing between consecutive electrodes on the strip.

For conveying the strip from the membrane supply station through the electrode supply station between electrode supply rollers, a first conveyor is used.

In some concrete embodiments, the electrode supply rollers of the electrode supply station are vacuum rollers for fixing the electrodes against the electrode supply rollers by suction, until the electrodes are deposited onto the membrane strip. Such rollers are useful in case that the electrodes are not provided as an endless strip but provided as sheets, for example after cutting them from an endless strip into pieces that match the final size of the MEA in the fuel cell.

After placement of the electrodes onto the membrane strip, the strip with the membrane and electrodes is conveyed on a conveyor to a lamination station, which comprises lamination rollers for pressing the electrodes onto the strip in a lamination process, optionally at temperatures elevated above room temperature, for example above 100° C.

Optionally, a binder is used for binding the electrodes onto the membrane strip in the lamination process. In practical embodiments, the binder is a polymer and has a glass transition temperature, and the temperature for the lamination process is adjusted to a temperature above the glass transition temperature. For example, for polytetrafluoroethylene (PTFE), the temperature should be above 110° C. in the lamination process.

However, the temperature for the production should not exceed a temperature detrimental to the dopant. For example, if the dopant is $H_3PO_4$, the temperature should be below 150° C. in order to avoid bubbles in the electrolyte. Such dopant is used for polybenzimidazole, PBI, membranes, optionally for use in high-temperature PEM fuel cells.

In some concrete embodiments for the production method, the strip has a first width and the electrodes have a second width that is less than the first width. When the electrodes are combined with and attached to the liquid-doped membrane strip, the electrodes are positioned between the two opposite side-edge regions of the strip. These edged regions are not being covered by the electrodes.

After the lamination station, such membrane strip with the electrodes remote from the edges of the strip is conveyed through a further calendering station, wherein oppositely placed calendering rollers press on the edge regions of the strip but not on the electrodes, or at least press less on the electrodes than on the edge regions. By doing so, the doping liquid is pressed out of the edge regions but not out of the area under the electrodes. This is important in that it provides a correct doping of electrolyte under the electrodes but prevents presence of electrolyte at locations where it is not needed, namely at the edge region of the strip. This has the advantage that the electrolyte is only provided where it is needed and does not lead to early malfunctioning of the fuel cell.

In concrete embodiment, the further calendering station is provided with at two calendering rollers located opposite to each other and facing each other with parallel rotation axes, wherein the calendering rollers have a central region matching the location of the electrodes when attached to the strip and a side region matching the side edge region of the strip when the strip with the electrodes is guided through the calendering region. The central region of at least one of the calendering rollers is provided as a cavity, optionally having a depth of at least half of a thickness of the strip with the electrodes, in order for the calendering roller to press along the side edge regions of the strip but not onto the electrodes or at least much less onto the electrodes than onto the side regions. Typically both calendering rollers with one roller on either side of the strip are provided with such cavity.

In those cases where the electrodes are provided as sheets, the positioning of the electrodes as pieces onto the strip implies the provision of spaces between the electrodes in a longitudinal direction of the strip, the following embodiment is useful. For example, the at least one of the calendering rollers comprises, in addition to the side region and the cavity, a cross bar extending from one side region to the opposite site region. When the circumference of the at least one calendering roller with the cavity is equal to the periodic length from one electrode to the next, the cross bar presses onto the strip at the locations of the spaces between the electrodes during the transport of the strip through the calendering station. It is understood that the motion of the strip through the calendering station and the dimensioning and speed of the calendering rollers are dimensioned to be synchronized with the strip movement so that the rotation of the rollers leads to the bar actually pressing in between the electrodes.

In some aspects of the invention, also the assembly of a fuel cell stack is automatic. For example, after the lamination station and the further calendering station, the MEA strip is conveyed to a cutting station for cutting the strip into separate MEAs. Optionally, the machine further comprises a bipolar plate supply station for automatically supplying bipolar plates, BPP. The machine is then further configured for automatically assembling a fuel cell stack by providing end plates for the fuel cell stack and for inserting the separate MEAs automatically in between multiple subsequently stacked bipolar plates.

As described above, the invention provides a method of producing a membrane-electrode assembly, MEA, where a quasi-endless strip of a membrane material doped with a liquid electrolyte is laminated with electrodes, and wherein edge regions of the strip as well as spaces between the electrodes are pressed free from surplus electrolyte.

It should be noted here that this production technique can also be applied for membrane components in other devices for power production or energy storage, as well as for conversion devices having bipolar design, for example batteries, electrical double-layer capacitors, electrolyzers, and generally in fuel cells. However, it has particular interest and advantages when used for MEAs in high-temperature PEM fuel cells.

SHORT DESCRIPTION OF THE DRAWINGS

The invention will be explained in more detail with reference to the drawings, wherein.

DETAILED DESCRIPTION/PREFERRED EMBODIMENT

In the following, examples are given for how to realize high-speed roll-to-roll fabrication of 3-layer MEAs that do not have protective gaskets along their edge regions. This is different from the procedures as disclosed in references [13-15]. Described are also potential fuel cells and fuel cell stacks based on the MEAs.

Figure 1:
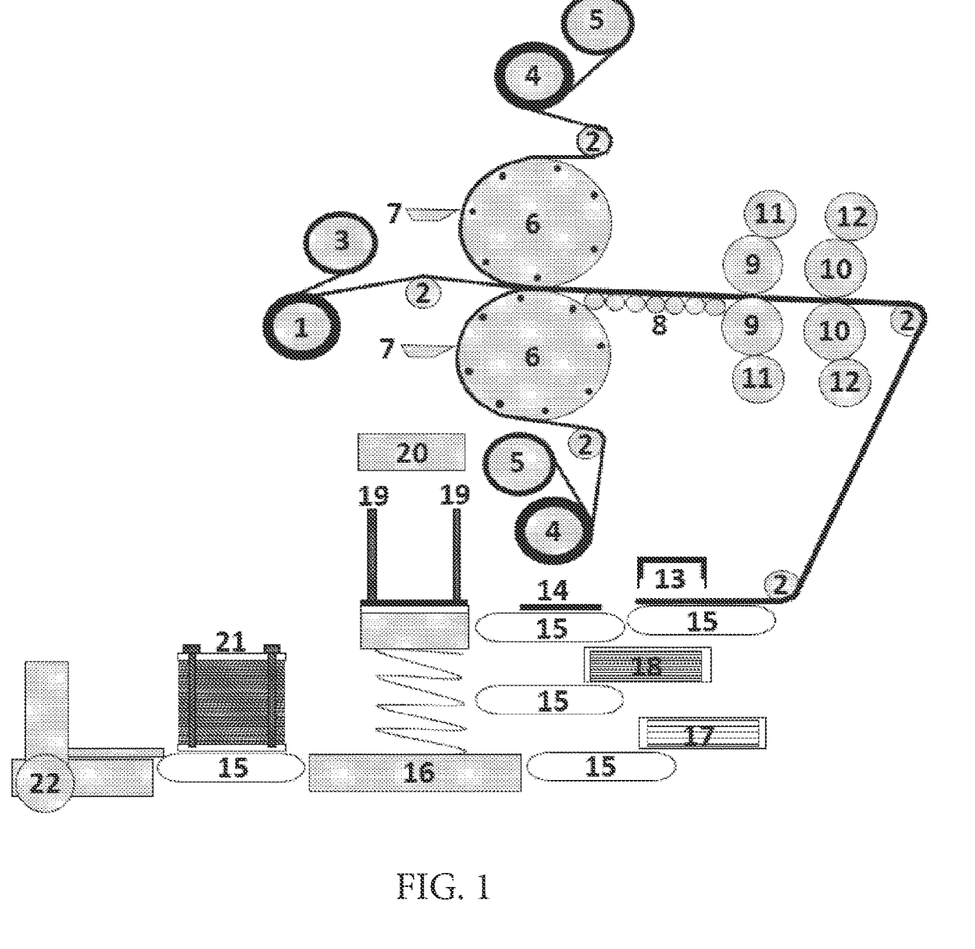
FIG. 1 is a scheme of a fuel cell stack assembling process with roll-to-roll MEA fabrication.

FIG. 1 illustrates a scheme of a fuel cell stack assembling process including roll-to-roll MEA fabrication. An orthophosphoric acid-doped polybenzimidazole ($H_3PO_4$—PBI) quasi-endless membrane film strip is provided on a membrane film roll 1 and unwound from its support film, which, in turn, is rolled onto support film roller 3. The support film is potentially a polyester film, for example polyethylene terephthalate (PET). The remaining doped PBI membrane film strip is guided over guider roller 2 and moved in between two vacuum rollers 6.

As part of the continuous process, electrodes are unwound from electrode rolls 4, while possible protective films, for example cellulose films, are removed onto roller 5. The unwound electrodes are cut into the correct size by knives 7 and held by vacuum in correct position on the vacuum rollers 6. Due to the PBI film being moved in between the vacuum rollers 6, the cut electrodes, which are held and transported by the vacuum rollers 6 to the membrane strip, are placed at predetermined positions onto opposite sides of the PBI membrane strip surfaces.

After these steps, the strip comprises consecutive sheets of electrodes on opposite sides of the strip, and the electrode-loaded strip is further guided by guiding rollers 8 until it passes through lamination rollers 9 of a first calendering station, which is a lamination station, where electrodes are laminated under pressure onto the surface of the membrane film strip. Cleaning rollers 11 are used to clean the lamination rollers 9 from orthophosphoric acid. Lamination rollers 9 can be kept at room temperature or optionally heated to elevated temperatures, for example to above 100° C., in order to enhance adhesion between the CL and the PEM.

For example, if PTFE is used as an electrode binding agent, it is advantageous to carry out the calendering lamination process at 110-130° C., because PTFE transforms from crystalline form to a rigid amorphous state at these temperatures, see reference [16]. On the other hand, temperatures higher than 150° C. are undesirable due to the increased risk of evaporation of the orthophosphoric acid as well as water bubble formation therein, see reference [17]. Thus, the temperature ranges as per Table 1 are especially useful for the MEA fabrication process. The temperatures in Table 1 are based on data given above as well as data of upper glass transition temperatures for other commonly used polymer binders, see references [18, 19].

TABLE 1

Desirable temperature ranges for assembling membrane and electrodes by to-roll-roll process

| Polymer binder | Temperature range (° C.) |
| --- | --- |
| Fluorinated ethylene (FEP) | 54-150 |
| Polytetrafluoroethylene (PTFE) | 110-150 |
| Polyvinylidene fluoride (PVDF) | 30-150 |

For example, for a MEA made of a $H_3PO_4$—PBI membrane and electrodes with a PTFE binding agent, the temperature range of 125±5° C. yields better electrochemical performance than a MEA produced at room temperature, i.e. at 25±5° C.

Figure 2:
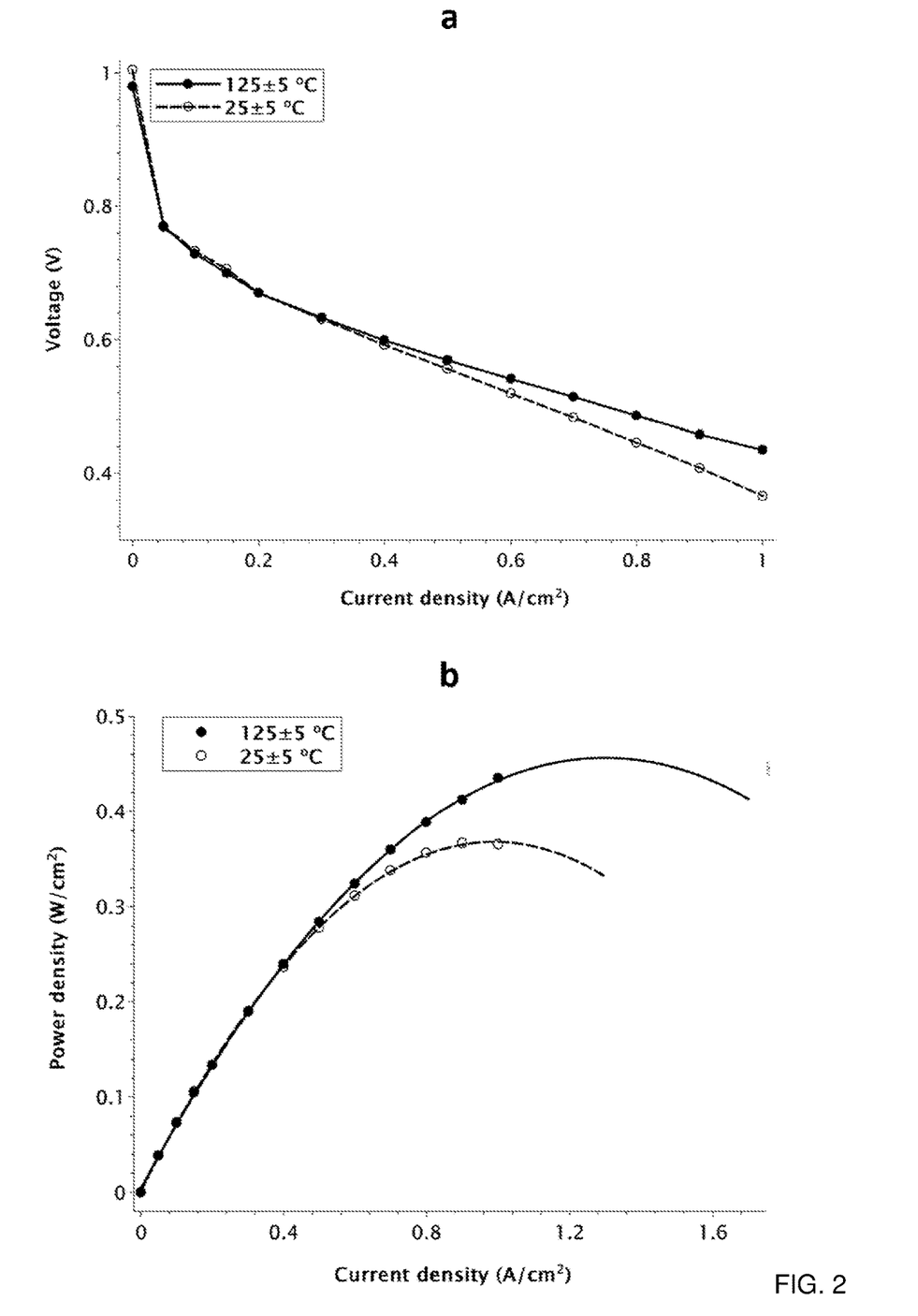
FIG. 2 are diagrams illustrating curves for (a) polarization and (b) power for MEAs produced via calendering at different temperatures.

In particular, use of elevated temperatures in the MEA's lamination process yields up to 25% increased power density. This is illustrated in FIG. 2, where diagrams are illustrating curves for (a) polarization and (b) power for MEAs produced via lamination calendering at different temperatures. It is clearly observed that the higher temperature results in better performance.

Another important parameter of the MEA's fabrication besides temperature during lamination is the speed of the rotation of the calendering machine, because the speed defines how long a MEA will be under pressure. The time of pressure onto the MEA affects the re-distribution of orthophosphoric acid within the MEA. Such redistribution is not desired if it leads to an inhomogeneous distribution of the acid. This effect sets a lower limit for the speed, as the speed should not be so slow that substantial redistribution takes place.

Figure 3:
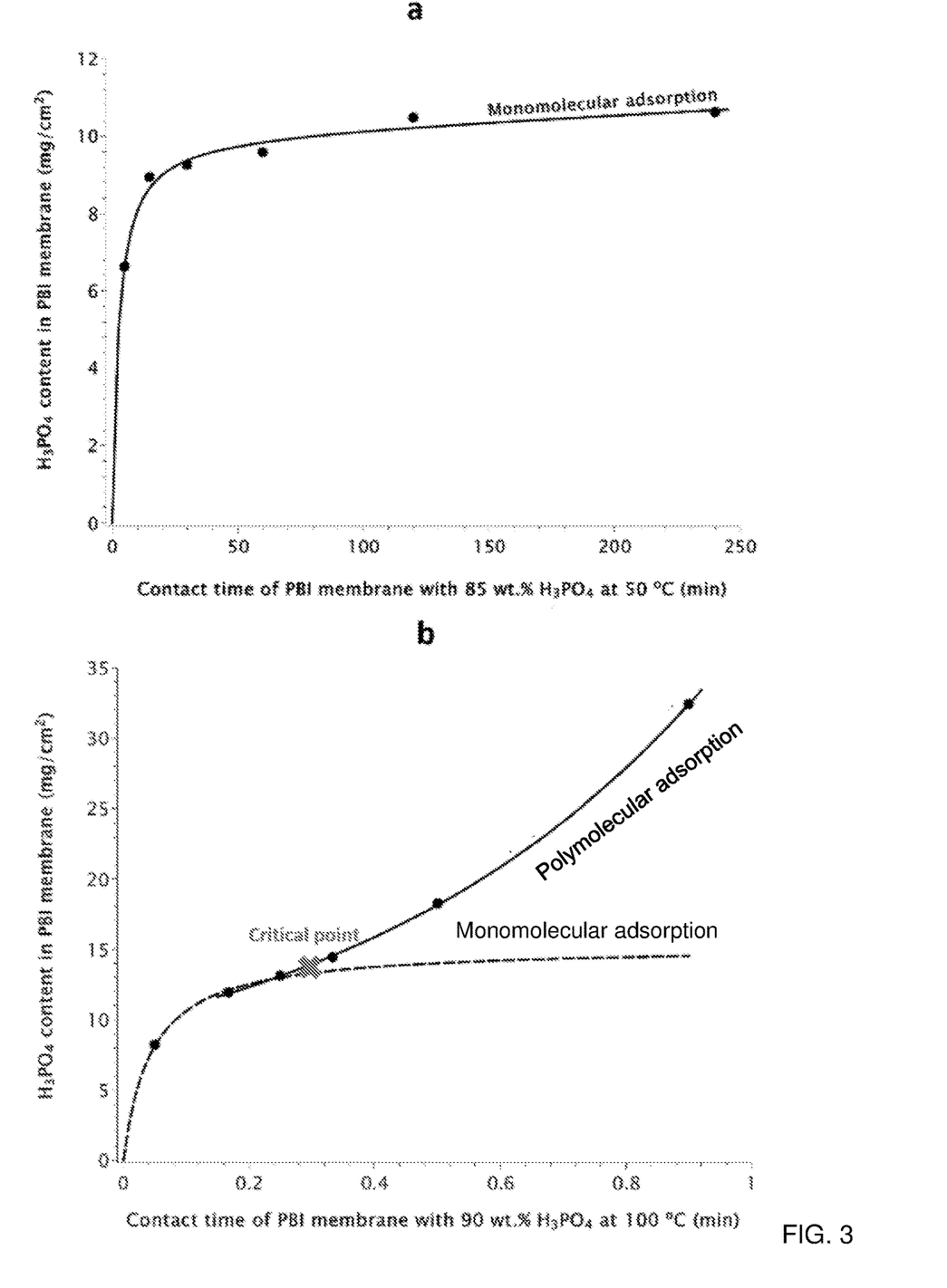
FIG. 3 are diagrams for adsorption isotherms for a $H_3PO_4$—PBI system describing (a) slow and (b) fast processes for acid doping of membranes.

On the other hand, the speed should also not be too high due to the following effect. FIG. 3 are diagrams for adsorption isotherms for a $H_3PO_4$—PBI system describing (a) slow and (b) fast acid doping processes of membranes. If the doping process is slow at relatively low temperature, the resulting effect is largely a monomolecular adsorption mechanism, while a fast doping process at elevated temperature is characterized by a change from monomolecular to a polymolecular adsorption, which leads to acid over-doping of the PBI membrane, where distances between polymer chains become longer. This, in turn, implies that the membrane structure is changed from film-like to gel-like with partially dissolution of PBI in $H_3PO_4$. Gelatinization is highly undesirable because the membrane is losing its strength and elasticity, which may have negative effects on the lifetime of the entire fuel cell stack. Accordingly, this effect sets an upper limit for the speed at which the process can be performed.

The speed and temperature should not be too high, as this leads to gel formation, and the speed and temperature should not be too low, as this leads to re-distribution and inhomogeneity. Therefore, a proper regime of speed has to be found experimentally for the process. However, not only the speed has to be adjusted correctly, also the related temperature for the lamination process must be selected correctly. This is a complex task.

Figure 4:
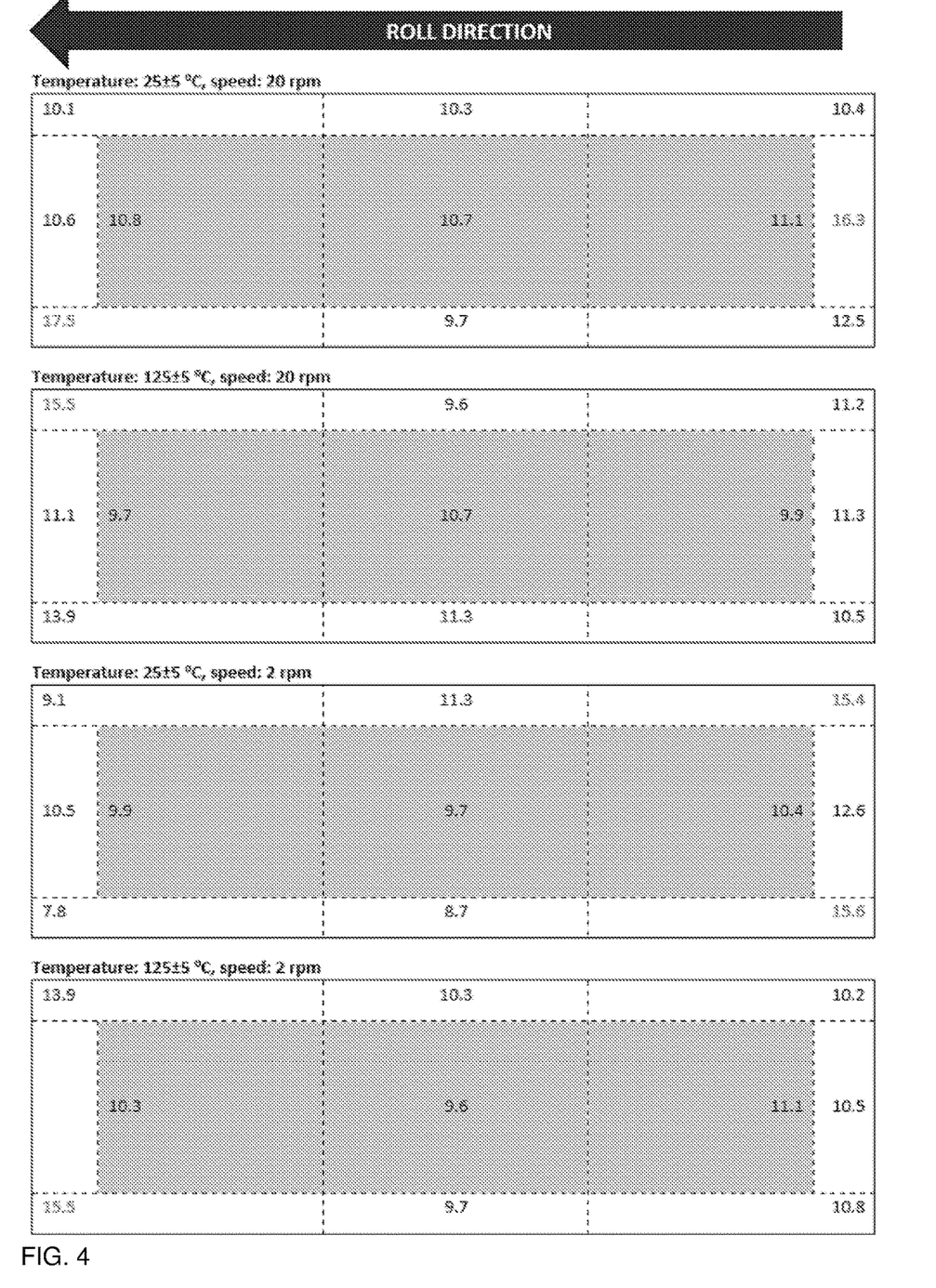
FIG. 4 is a drawing showing measurements for re-distribution of orthophosphoric acid in MEAs after their calendering through a calendering lamination station at different temperature and speed.

In order to illustrate the dependency of the speed on re-distribution, reference is made to FIG. 4, which illustrates measurements of content of orthophosphoric acid in terms of $mg/cm^2$ on an 80 μm thick PBI membrane film. Four pieces of PBI film are shown, each having a grey central area that illustrates the electrodes on the PBI film membrane, which is outlined with white edge regions. Measurements were made on different locations on the shown pieces of PBI membrane, including at the corners, midway between the corners, and at three locations on the electrode, namely at the opposite ends of the electrode and midway therein between.

The data presented in FIG. 4 for the four pieces of membranes with electrodes relate to four different production methods, namely:

25° C. at 20 rpm,
125° C. at 20 rpm,
25° C. at 2 rpm, and
125° C. at 2 rpm.

As illustrated, the upper of the four pieces of membranes was laminated at a temperature of 25° C. and a relative speed of 20 rpm of the calendering roller. It is seen that the corners of the piece have acid content ranging from 9.7 in the lower edge region to 17.5 in the lower left corner and 16.3 in the right edge. This is an undesired variation of almost a factor of 2 due to heavy re-distribution of the acid because of low temperature despite high speed.

It should be noted here that an example of a useful maximum level of orthophosphoric acid in the PBI membrane is 14.5 mg/cm$^2$ per 80 μm thickness. However, this level is strongly depended on the PBI-type that is used in the membrane, e.g. poly[2,5-benzimidazole] (ABPBI), poly[2,2'-m-(phenylene)-5,5'-bibenzimidazole] (m-PBI) or poly[2,2'-p-(phenylene)-5,5'-bibenzimidazole] (p-PBI), on molar mass of the polymer, and on the presence of additives therein, as well as other factors, due to different adsorption capacity of the membranes, see also references [20-22].

When comparing pieces fabricated at low temperature with pieces fabricated at high temperature, it is observed from FIG. 4 that the pieces fabricated at low temperature each have two locations that relate to yield acid levels higher than the maximum target value of 14.5, whereas the pieces fabricated at high temperature have only one of such locations exceeding the maximum set level. Accordingly, from the data in FIG. 4, it can be concluded that higher temperatures are preferable for lamination of MEAs because fewer critical points are observed on the edge regions. In particular, there are 2 critical points at 25° C. and there is only 1 critical point at 125° C. for both speeds of 2 rpm and 20 rpm.

It was expected that reduction of the speed of the calendering machine would lead to acid re-distribution. This was also observed at 25° C. However, it was surprising that re-distribution was observed to a substantially lesser degree when the process is carried out at 125° C. However, such behavior can be explained by means of adsorption isotherm, see FIG. 3. It can be concluded that the doping process takes place rapidly at 125° C., i.e. acid has enough time to be distributed inside PBI membrane, and it is more uniformly re-doping the membrane, whereas at room temperature the acid mainly fills defected locations, e.g. cracks or pores. Although, increased time under compression allows to start a re-doping process at 25° C., the higher temperature lamination is preferable.

From these experiments, it could be concluded that a process at 125° C. is more robust than at room temperature.

It should be noted that the acid content in MEAs within the active area is relatively stable regardless of the different calendering parameters, namely 10-11 mg/cm$^2$. However, large variations are seen at the edge regions, which required further improvements.

Especially, elimination of critically high acid content at the edge regions of the membrane strip is an important task in the fabrication of inner gasket-free MEAs, if these should have a long lifetime. This problem was solved by a second calendering station with calendering rollers 10, see FIG. 1. These calendering rollers 10 are special in that they only compress the edge area of the MEAs and squeeze the extra orthophosphoric acid out of the membrane. For optimum results, calendering rolls, as shown in FIG. 5, were designed specifically for this purpose.

Figure 5:
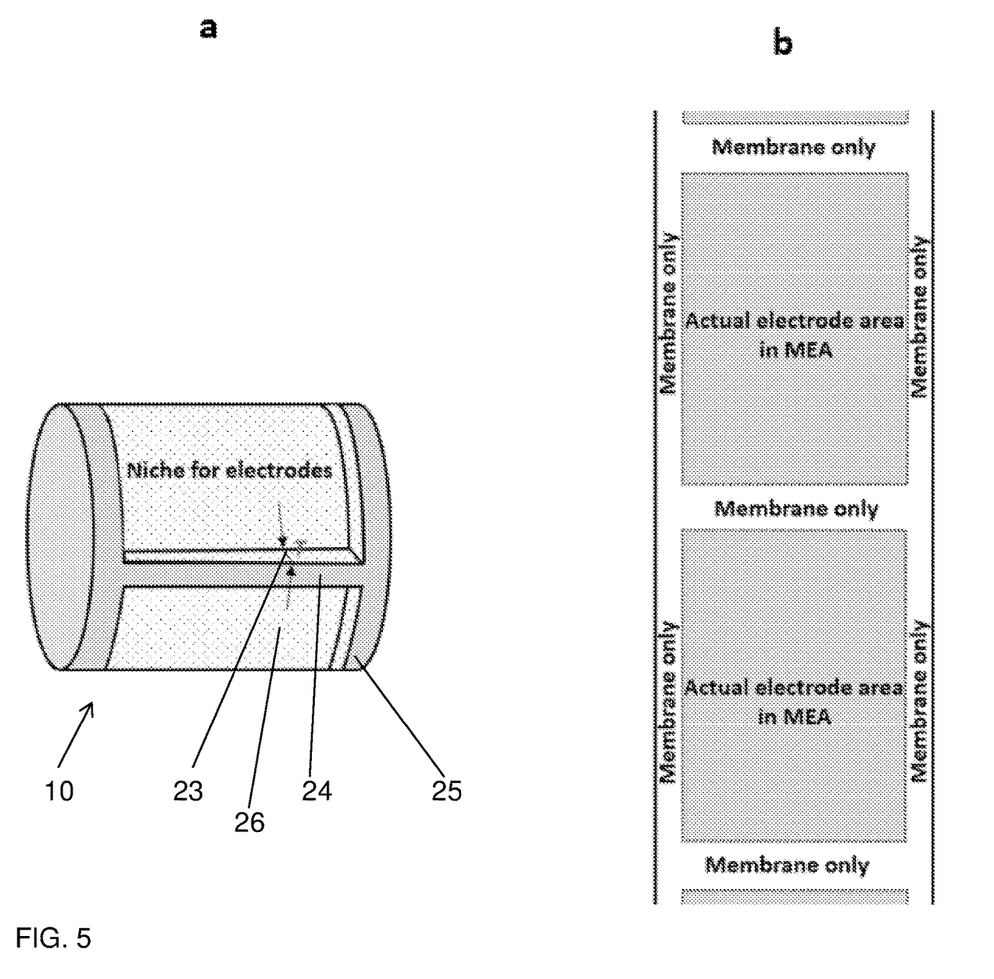
FIG. 5 is a drawing illustrating (a) a design of rollers in a second calendering station for compressing regions where there are membranes only but not electrodes and (b) an illustration of part of the MEA roll after the lamination station.

FIG. 5*a* is illustrating a design of a roller 10 in such a second calendering station for compressing an area at the edge regions where only membrane is present but no electrodes. FIG. 5*b* illustrates the corresponding PBI film with the electrodes, which are shown as grey areas on top and bottom. The roller 10 in FIG. 5*a* has a cavity/niche 26 which accommodates the electrodes during the calendering process, while edge regions 25 of the roller 10 are elevated relatively to the cavity 26 in order to press onto the corresponding edge regions of the PBI film. In addition, the roller 10 has a transverse bar 24 that presses the membrane film only between the electrode areas but does not press onto the electrode areas.

The most important element in that design is the cavity/niche for the electrodes that have already been laminated onto the membrane. Such cavity/niche protects the electrode from over-compression. Advantageously, its depth 23 T is no less than half of the total thickness of the MEA after the MEA has passed the lamination station 9.

Notice that cleaning rollers 12 in FIG. 1 are used to clean the surface of the calendering rollers 10.

Figure 6:
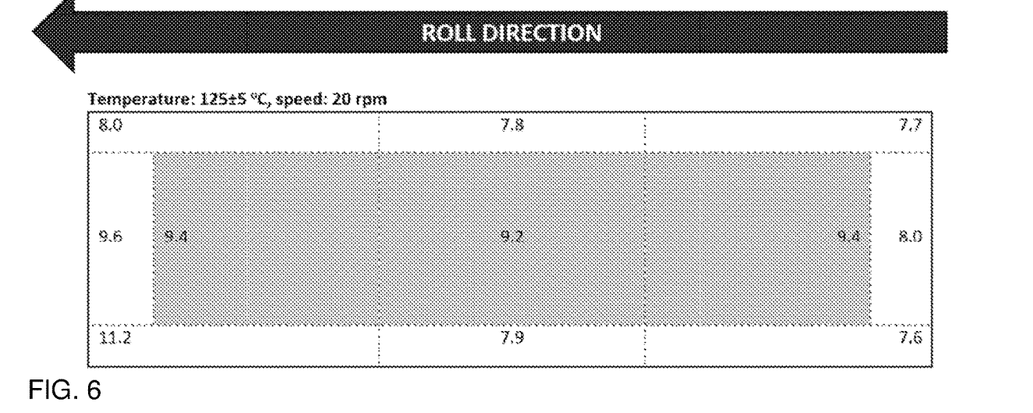
FIG. 6 is a drawing showing measurements of re-distribution of orthophosphoric acid in a MEA after its calendering through the lamination station and through the second calendering station.

The final acid distribution after passing these two calendering stations with respective rollers 9 and 10 at 125° C. and 20 rpm is presented in FIG. 6 similar to the measurement points in FIG. 4. FIG. 6 shows measurements of re-distribution of orthophosphoric acid in MEA after its calendering through both the lamination station with lamination rollers 9 and the second calendering station with the calendering rollers 10. As seen from FIG. 6, orthophosphoric acid is distributed uniformly in the active area of the MEA—its average content is 9.3 mg/cm$^2$ with deviations of no more than 0.1 mg/cm$^2$. There are no over-doped locations on the perimeter of the MEA, and the amount of $H_3PO_4$ is far from critical levels.

With reference to FIG. 1, the roll of MEAs is cut by a knife 13 to form sheets with single MEAs 14, which are moved on the conveyor belt 15 to the assembly table 16. The assembly table 16 has an adjustable height. Endplates for fuel cell stack are provided from magazine 17 and bipolar plate with gaskets from magazine 18. Further, bolts 19 are delivered by means of corresponding conveyors.

The build-up of the fuel cell stack occurs according to following step-by-step procedure with MEAs sandwiched between bipolar plates (BPP): For example, according to the following sequence:

(I) endplate
(II) bipolar plate (BPP)
(III) MEA cut by frame 14
(IV) BPP and then repeating steps III and IV until a required amount of MEAs and BPP has been reached, after which another endplate is provided for finishing the stack.

Plate 20 creates correct compression to the stack, when the bolts and nuts are tightened. Assembled in such way, the fuel cell stack 21 is transported by further conveyor belt 15 to the carrier located on a cargo robot 22 for its further storage.

As a conclusion, the proposed automated process of making MEAs and fuel cell stacks based on the MEAs has multiple advantages, such as continuity and fast speed by which high productivity and low costs are achieved. Uniform distribution of orthophosphoric acid in MEAs is properly controllable for avoiding critical levels. Two calendering stations are used, one for lamination and one for controlling acid levels at the edges and between the electrodes by local compression of predetermined parts of a MEA. This keeps the PBI membrane in a condition that is safe from dissolution by hot concentrated $H_3PO_4$ even without using protective gaskets on the perimeter of a MEA. The illustrated MEA is a 3-layer sandwich construction of a membrane between two electrodes, which is advantageous in comparison with the prior art 5-layer structure as described in reference [14].

Moreover, when comparing polarization curves for MEAs with and without protective polyimide (PI) gaskets, it has been found that there is almost no difference between them when values are corrected for the actual active area. To investigate this, a comparative study was made. The results are presented and explained in the following with reference to FIG. 7 and FIG. 8, comparing membranes with and without PI gasket.

Figure 7:
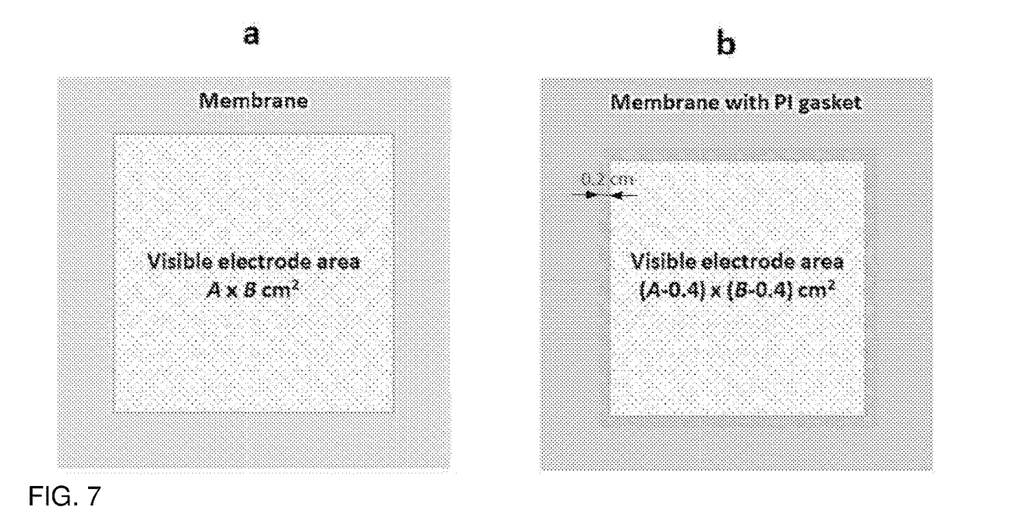
FIG. 7 is a drawing illustrating differences in the visible electrode area and the active area for MEAs (a) without and (b) with PI gaskets.
Figure 8:
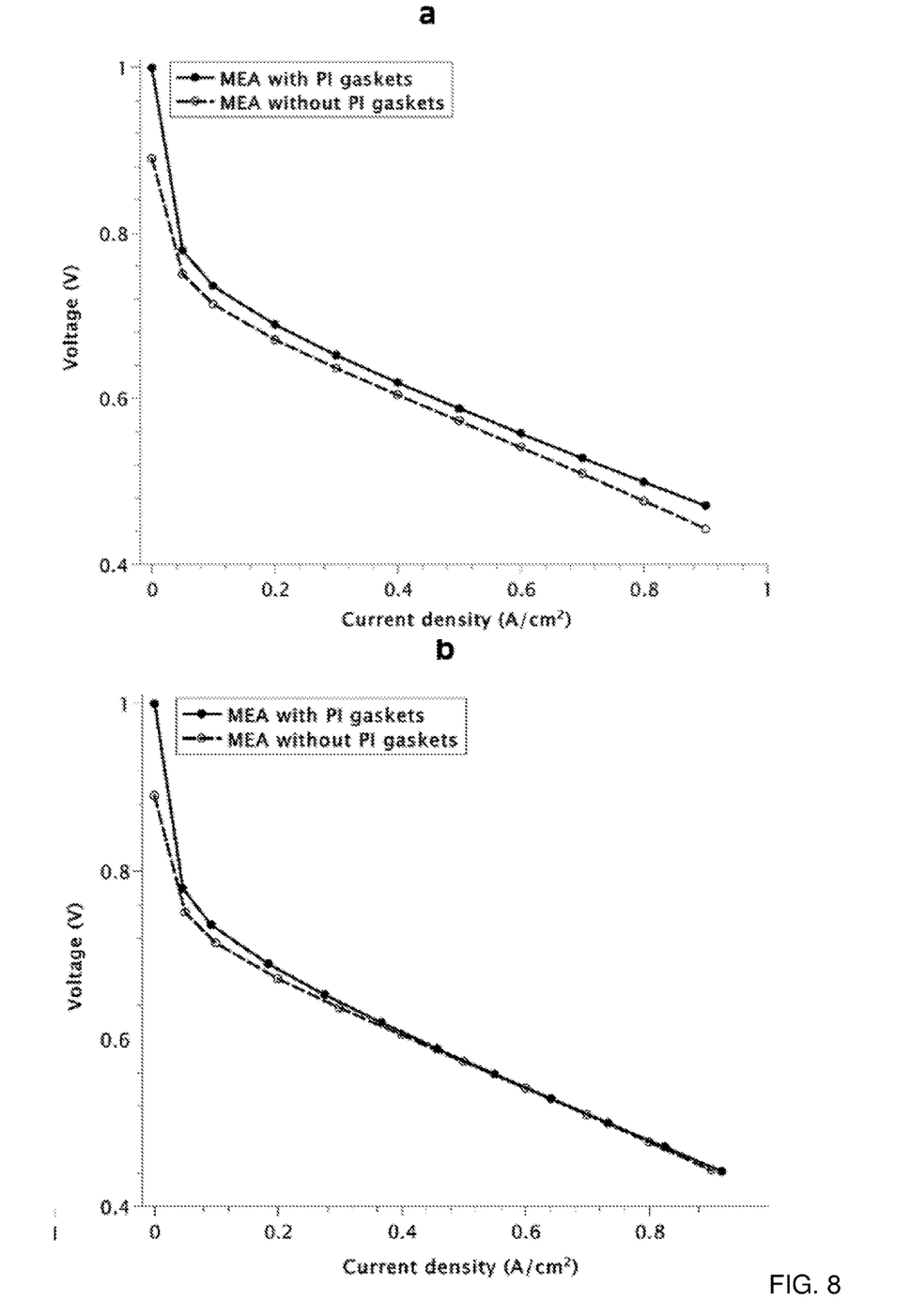
FIG. 8 shows polarization curves for MEAs with and without PI gaskets where the current is normalized (a) by the visible electrode area and (b) by the active area.

The actual electrode area is the same for both MEAs in FIG. 7, namely A×B $cm^2$. However, whereas the 3-layer MEA without PI gaskets has a visible electrode area which is equal to the active area, namely A×B, this is not so for the 5-layer MEA with PI gaskets. In the latter case, first of all, it is observed that the 5-layer MEA with PI gaskets has a smaller visible electrode area, because 2 mm of the electrode on the perimeter is covered by a PI gasket. Although, about 1 mm of the electrode on each side under the PI gasket is not inert, it still results in an active area for the 5-layer MEA of (A−0.2)×(B−0.2) $cm^2$. This implies that the prior art 5-layer MEA with the gaskets have a smaller active area if the overall dimensions of membrane and electrode otherwise are the same.

Observed was the following. Although, the 5-layer structure with the PI gaskets had a slightly higher performance per area, this was balanced in the 3-layer MEA by a slightly larger total active area. For greater detail, reference is made to FIG. 8a, which shows polarization curves for MEAs with and without PI gaskets where the measured current is normalized to the visible electrode area (a). It is observed that the MEA with PI gasket has a slightly higher performance experimentally. However, when the results are normalized to the actual active area, as explained in relation to FIG. 7, no difference was found, as already mentioned above. Accordingly, the method of the invention is proven to provide equally good results as the prior art but with a much simpler procedure where gaskets are avoided.

In summary, the invention provides a continuous roll-to-roll process of MEA fabrication with already-doped membrane, in particular for high-temperature PEM fuel cells. The specific double calendering of the 3-layer MEA roll with only local compression along edge regions and between the electrodes protects the electrodes from disadvantageous pressure and avoids unwanted redistribution and overshooting of acid content. All in all, it leads to improved control of the dopant content and its distribution in the MEA.

REFERENCES

[1] Hulett J S. Method of making MEA for PEM/SPE fuel cell. USA patent (2000) U.S. Pat. No. 6,074,092
[2] He R, Li Q, Bach A, Jensen J O, Bjerrum N J. Physicochemical properties of phosphoric acid doped polybenzimidazole membranes for fuel cells. Journal of Membrane Science 277 (2006) 38-45
[3] Song C H, Park J S. Effect of dispersion solvents in catalyst inks on the performance and durability of catalyst layers in proton exchange membrane fuel cells 12 (2019) 549-559
[4] Cho Y H, Kim S K, Kim T H, Cho Y H, Lim J W, Jung N, Yoon W S, Lee J C, Sung Y E. Preparation of MEA with polybenzimidazole membrane for high temperature PEM fuel cell. Electrochemical and Solid-State Letters 14 (2011) B38-B40
[5] Zhang J, Dioguardi M, Wagner F T. Method for membrane electrode assembly fabrication and membrane electrode assembly. USA patent (2015) U.S. Pat. No. 8,940,461 B2
[6] Cho E A, Jang H S, Lim T H, Oh I H, Nam S W, Kim H J, Jang J H, Kim S K. Method for producing a membrane-electrode assembly for a fuel cell. USA patent (2011) US 2011/0240203 A1
[7] Lian H, Su H, Pollet B G, Pasupathi S. Development of membrane electrode assembly for high temperature proton exchange membrane fuel cell by catalyst coating membrane method. Journal of Power Sources 288 (2015) 121-127
[8] Lian X, Pan G, Xu L, Wang J. A modified decal method for preparing the membrane electrode assembly of proton exchange membrane fuel cells. Fuel 139 (2015) 393-400
[9] Cho J H, Kim J M, Prabhuram J, Hwang S Y, Ahn D J, Ha H Y, Kim S K. Fabrication and evaluation of membrane electrode assemblies by low-temperature decal methods for direct methanol fuel cell. Journal of Power Sources 187 (2009) 378-386
[10] Mehmood A, Ha H Y. An efficient decal transfer method using a roll-press to fabricate membrane electrode assemblies for direct methanol fuel cells. International Journal of Hydrogen Energy 37 (2012) 18463-18470
[11] Bodner M, Garcia H R, Steenberg T, Terkelsen C, Alfaro S M, Avcioglu G S, Vassiliev A, Primdahl S, Hjuler H A. Enabling industrial production of electrodes by use of slot-die coating for H T-PEM fuel cells. International Journal of Hydrogen Energy 44 (2019) 12793-12801
[12] Steenberg T, Hjuler H A, Terkelsen C, Sanchez M T R, Cleemann L N, Krebs F C. Roll-to-roll coated membranes for high temperature PEM fuel cells. Energy & Environmental Science 5 (2012) 6076-6080
[13] Barnwell D A, Ralph T R, Trew P A. Membrane electrode assembly. USA patent (2013) U.S. Pat. No. 8,399,145 B2
[14] Pawlik J, Baurmeister J, Padberg C. Membrane electrode unit comprising a polyimide layer. USA patent (2006) US 2006/0014065 A1
[15] Kohler J, Starz K A, Wittpahl S, Diehl M. Process for producing a membrane electrode assembly for fuel cells. USA patent (2006) U.S. Pat. No. 6,998,149 B2
[16] Calleja G, Jourdan A, Ameduri B, Habas J P. Where is the glass transition temperature of poly(tetrafluoroethylene)? A new approach by dynamic reometry and mechanical tests. European Polymer Journal 49 (2013) 2214-2222
[17] Korte C, Conti F, Wackerl J, Lehnert W. Phosphoric acid and its interactions with polybenzimidazole-type polymers. High temperature Polymer Electrolyte Membrane Fuel Cells, Springer (2016) 169-194
[18] Mohajir B E, Heymans M. Changes in structural and mechanical behavior of PVDF with processing and thermomechanical treatments. 1. Change in structure. Polymer 42 (2001) 5661-5667
[19] Gupta B, Scherer G G. Radian-induced grafting of styrene onto FEP films: Structure and thermal behaviour of copolymers. Die Angewandte Makromolekulare Chemie 210 (1993) 151-164
[20] Li Q F, Rudbeck H C, Chromic A, Jensen J O, Pan C, Steenberg T, Calverley M, Bjerrum N J, Kerres J. Properties, degradation and high temperature fuel cell test of different types of PBI and PBI blend membranes. Journal of Membrane Science 347 (2010) 260-270
[21] Daletou M K, Gourdoupi N, Kallitis J K. Proton conducting membranes based on blends of PBI with aromatic polyethers containing pyridine units. Journal of Membrane Science 252 (2005) 115-122
[22] Lobato J, Canizares P, Rodrigo M A, Linares J J, Aguilar J A. Journal of Membrane Science 306 (2007) 47-55
[23] US 2007/0289707A1 by Rohland et al., (2007)
[24] US 2018/0290441A1 by Adachi et al. (2018)
[25] US 2007/0116999 by Kuramochi et al (2018)
[26] EP 1230705 B1 by 3M Innovative Properties Company (2010)
[27] US 2010/0279197 by Kim et al (2019)

The invention claimed is:

1. A method of producing a membrane-electrode assembly, MEA, the method comprising: providing a quasi-endless strip of a membrane material doped with a liquid electrolyte; providing electrodes for assembly with the membrane strip and attaching the electrodes to the liquid-doped membrane strip; laminating the electrodes onto the strip in a calendering lamination station by guiding the strip in between two oppositely positioned lamination rollers and compressing the electrodes and the strip for lamination by the two lamination rollers wherein the strip has a first width and the electrodes have a second width that is less than the first width; wherein the combining of the electrodes with the liquid-doped membrane strip implies positioning the electrodes between two opposite side edge regions of the strip, which are not covered by the electrodes; wherein the method further comprises moving the strip after the lamination station through a further calendering station, wherein the oppositely placed calendering rollers of the further calendering station have a central region matching the location of the electrodes on the strip and a side region matching the side edge region of the strip when the strip with the electrodes is guided through the further calendering region; wherein the central region of at least one of the calendering rollers is provided as a cavity in order for the calendering rollers to press on and along the side edge regions of the strip but not onto the electrodes and removing surplus electrolyte from the edge regions of the strip by pressing the calendering rollers onto the edge regions of the strip.

2. The method according to claim 1, wherein the method comprises providing the electrodes as pieces and not as an endless strip, and wherein the positioning of the electrodes onto the strip implies the provision of a spacing between the electrodes in a longitudinal direction of the strip, and wherein the at least one of the calendering rollers in addition to the side region and the cavity has a cross bar extending from one side region to the opposite side region, wherein the circumference of the at least one calendering roller with the cavity is equal to the periodic length from one electrode to the next so that the pressing of the cross bar onto the strip is synchronized with the spacing, and the method comprises pressing the cross bar onto the spaces between the electrodes on the strip during the transport of the strip through the calendering rollers for removing surplus electrolyte from the spaces between the electrodes.

3. The method according to claim 1, wherein the method comprises attaching electrodes on both sides of the strip and wherein both of the calendering rollers are provided with a cavity and elevated side regions.

4. The method according to claim 1, wherein the method comprises using a binder for binding the electrodes onto the membrane strip in the lamination process, the binder being a polymer and having a glass transition temperature, the method comprising adjusting the temperature for the lamination process to a temperature above the glass transition temperature but below a temperature that causes bubbles in the electrolyte.

5. The method according to claim 4, wherein the electrolyte is orthophosphoric acid, and the lamination temperature is below 150° C.

6. The method according to claim 4, wherein the binder is PTFE, and the lamination temperature is above 110° C.

7. The method according to claim 1, wherein the electrodes are provided as a roll material and cut into pieces in a continuous process for providing the electrodes as pieces and not as an endless strip when positioning the electrodes onto the strip of membrane material, wherein the electrodes pieces are held by vacuum onto a vacuum roller and transported to the membrane strip and positioned from the vacuum roller onto the strip.

8. The method according to claim 1, wherein the membrane strip with the attached electrodes is cut for providing separate MEA pieces; and wherein multiple of such MEA pieces are automatically inserted between bipolar plates for automated production of a fuel cell stack, including end plates for the stack.

9. The method according to claim 8, wherein the method comprises providing the fuel cells in the fuel cell stack as high temperature proton exchange membrane, HT-PEM, fuel cells.

10. The method according to claim 1, wherein the method comprises providing the doped membrane as a $H_3PO_4$—doped PBI membrane.

11. A production machine for producing a membrane-electrode assembly, MEA, the machine comprising:
a membrane supply station with a first roller for supplying an endless strip of a membrane material doped with a liquid electrolyte;
an electrode supply station with a pair of opposite electrode supply rollers, the machine comprising a first conveyor for conveying the strip from the membrane supply station through the electrode supply station between the electrode supply rollers; wherein the electrode supply station is configured for placing electrodes onto the membrane strip with a predetermined longitudinal spacing between consecutive electrodes on the strip:
a lamination station comprising lamination rollers for pressing the electrodes onto the strip in a lamination process;
a second conveyor for conveying the strip from the electrode supply station to the lamination station,
a calendering station with opposite calendering rollers, wherein the calendering rollers have a central region matching the location of the electrodes when attached to the strip and a side region matching the side edge region of the strip when the strip with the electrodes is guided through the calendering region; wherein the central region of at least one of the calendering rollers is provided as a cavity having a depth at least half of a thickness of the strip with the electrodes in order at least one of the calendering rollers pressing along the side edge regions of the strip but not onto the electrodes.

12. The machine according to claim 11, wherein the machine is configured for heating the lamination rollers to temperatures above 100° C.

13. The machine according to claim 11, wherein at least one of the calendering rollers in addition to the side region and the cavity has a cross bar extending from one side region to the opposite site region, wherein the thickness of the cross bar is equal to the spacing between the electrodes when attached to the strip, and wherein the circumference of the at least one calendering roller with the cavity is equal to the periodic length from one electrode to the next in order for the pressing of the cross bar onto the strip synchronized into the predetermined longitudinal spacing between consecutive electrodes on the strip when the strip is conveyed through the calendering station during operation of the machine.

14. The machine according to claim 13, wherein the machine comprises a MEA cutting station for cutting the strip into separate MEAs; and wherein the machine further comprises a BPP supply station for automatically supplying bipolar plates, BPP, and wherein the machine is configured for automatically assembling a fuel cell stack by providing end plates for stack and for inserting the separate MEAs automatically in between multiple subsequently stacked bipolar plates.

15. The machine according to claim 11, wherein the electrode supply rollers of the electrode supply station are vacuum rollers for fixing the electrodes against the electrode supply rollers, until depositing the electrodes onto the strip.

* * * * *